United States Patent
Ito et al.

(10) Patent No.: US 11,892,422 B2
(45) Date of Patent: Feb. 6, 2024

(54) PARTICULATE-MATTER DETECTING SENSOR ELEMENT

(71) Applicants: IBIDEN CO., LTD., Ogaki (JP); DENSO CORPORATION, Kariya (JP)

(72) Inventors: Yasutaka Ito, Ibi-gun (JP); Tomoyoshi Nakamura, Ibi-gun (JP); Takeshi Ushida, Ibi-gun (JP); Takehito Kimata, Kariya (JP); Masahiro Yamamoto, Kariya (JP)

(73) Assignees: IBIDEN CO., LTD., Ogaki (JP); DENSO CORPORATION, Kariya (JP)

( * ) Notice: Subject to any disclaimer, the term of this patent is extended or adjusted under 35 U.S.C. 154(b) by 556 days.

(21) Appl. No.: 17/265,495

(22) PCT Filed: Aug. 9, 2019

(86) PCT No.: PCT/JP2019/031580
§ 371 (c)(1),
(2) Date: Feb. 2, 2021

(87) PCT Pub. No.: WO2020/045049
PCT Pub. Date: Mar. 5, 2020

(65) Prior Publication Data
US 2021/0199611 A1 Jul. 1, 2021

(30) Foreign Application Priority Data
Aug. 28, 2018 (JP) .................. 2018-159629

(51) Int. Cl.
*G01N 27/16* (2006.01)
*G01N 15/06* (2006.01)
*G01N 15/00* (2006.01)

(52) U.S. Cl.
CPC ......... *G01N 27/16* (2013.01); *G01N 15/0606* (2013.01); *G01N 15/0656* (2013.01); *G01N 2015/0046* (2013.01)

(58) Field of Classification Search
CPC ...................................................... G01N 27/16
(Continued)

(56) References Cited

U.S. PATENT DOCUMENTS 4,066,413 A * 1/1978 Segawa .................. G01N 27/12
338/34
4,333,067 A * 6/1982 Kugimiya .............. H01C 1/142
338/34

(Continued)

FOREIGN PATENT DOCUMENTS

| JP | 2002-098666 | 4/2002 |
|---|---|---|
| JP | 2010-171431 | 8/2010 |

(Continued)

OTHER PUBLICATIONS

International Preliminary Report on Patentability with Written Opinion of the International Searching Authority for corresponding International Application No. PCT/JP2019/031580, dated Mar. 11, 2021.

(Continued)

*Primary Examiner* — Arlen Soderquist
(74) *Attorney, Agent, or Firm* — MORI & WARD, LLP

(57) ABSTRACT

A particulate-matter detecting sensor including an insulating substrate which has a detecting face, detecting conductors formed in the insulating substrate, and a heating section formed on the insulating substrate. Each detecting conductor includes a detecting electrode part, a terminal part, and a connecting part. A portion of the detecting conductor is constituted of a noble metal conductor mainly formed of at least one noble metal selected from Pt, Au, Pd, Rh and Ir. At (Continued)

least a portion of the connecting part is formed of a low expansion conductor mainly formed of a low expansion coefficient metal having linear expansion coefficient lower than that of the noble metal. Both conductors are joined at an overlapping part at which the noble metal conductor and the low expansion conductor are partly overlapped with each other on an insulating layer forming the insulating substrate in a normal line direction of the insulating layer.

10 Claims, 9 Drawing Sheets

(58) Field of Classification Search
 USPC .......................................................... 422/94
 See application file for complete search history.

(56) References Cited

U.S. PATENT DOCUMENTS

| | | | |
|---|---|---|---|
| 6,592,731 B1* | 7/2003 | Lawless | G01N 27/4071 204/426 |
| 10,557,815 B2 | 2/2020 | Yamamoto et al. | |
| 2002/0046947 A1* | 4/2002 | Lawless | G01N 27/4071 204/426 |
| 2005/0279084 A1* | 12/2005 | Schmidt | F01N 9/002 60/297 |
| 2006/0185978 A1* | 8/2006 | Nagao | G01N 27/4071 204/424 |
| 2007/0119233 A1* | 5/2007 | Schnell | G01N 15/0656 73/23.31 |
| 2009/0056416 A1* | 3/2009 | Nair | G01N 15/0656 73/28.01 |
| 2010/0190023 A1 | 7/2010 | Gross et al. | |
| 2010/0229629 A1* | 9/2010 | Egami | G01N 15/0656 73/28.01 |
| 2016/0334321 A1* | 11/2016 | Koike | G01M 15/102 |
| 2017/0138877 A1 | 5/2017 | Otomaru et al. | |
| 2017/0138893 A1* | 5/2017 | Nakayama | G01N 27/4075 |
| 2017/0322134 A1* | 11/2017 | Koike | G01M 15/102 |
| 2018/0052128 A1* | 2/2018 | Kimura | G01N 15/0656 |
| 2018/0266936 A1 | 9/2018 | Yamamoto et al. | |
| 2019/0003997 A1 | 1/2019 | Noguchi et al. | |
| 2020/0141893 A1* | 5/2020 | Otomaru | G01N 15/0606 |
| 2021/0310972 A1* | 10/2021 | Ito | G01N 27/16 |

FOREIGN PATENT DOCUMENTS

| | | |
|---|---|---|
| JP | 2013-242283 | 12/2013 |
| JP | 2017-058365 | 3/2017 |
| WO | WO 2016/031739 | 3/2016 |
| WO | WO 2017/104818 | 6/2017 |
| WO | WO 2020/045048 | 3/2020 |

OTHER PUBLICATIONS

International Search Report for corresponding International Application No. PCT/JP2019/031580, dated Nov. 5, 2019.

* cited by examiner

PARTICULATE-MATTER DETECTING SENSOR ELEMENT

TECHNICAL FIELD

The present invention relates to a particulate-matter detecting sensor element for detecting particulate-matters in a gas to be measured.

BACKGROUND ART

For example, in order to detect the amount of particulate matters in an exhaust gas discharged from an internal combustion engine (i.e., Particulate Matter: PM), an electric resistance type particulate-matter detecting sensor (hereinafter referred to as a PM sensor as appropriate) has been used.

Patent Document 1 discloses a particulate-matter detecting sensor element having a detecting section for detecting particulate-matters (hereinafter referred to as a PM sensor element as appropriate) on the surface of an insulating substrate of laminated structure. The detecting section has a detecting electrode exposed therefrom. In addition, an extraction electrode is embedded in the insulating substrate. A heater for heating the detecting section is also embedded in the insulating substrate.

Patent Document 2 discloses a sensor element having a detecting electrode made mainly of platinum, and an extraction electrode made mainly of molybdenum or tungsten.

PRIOR ART LITERATURE

Patent Documents

Patent Document 1: Japanese Laid-open Patent Publication 2017-58365
Patent Document 2: Japanese Laid-open Patent Publication 2013-242283

SUMMARY OF THE INVENTION

Problems to be Solved by the Invention

However, for a PM sensor element, there is a demand for improvement in durability. In more concrete, the improvements in temperature cycle resistance and oxidation resistance and so on have been required. In other words, since the measurement of particulate matter detection by the PM sensor element is conducted at the heating section under a high temperature state, for example, heated to the temperature of 600-800° C., the PM sensor is exposed to the repetitive temperature cycling between the normal temperature and the high temperature as exampled above.

Therefore, for a detecting conductor of the PM sensor element, it is necessary to have durability to long term-use even under influence of temperature cycling, meanwhile for the detecting conductor, it is necessary to maintain function of detecting particulate matters without being affected even under a high temperature combustion state.

In the PM sensor element disclosed in Patent Document 1, the detecting conductor is entirely formed of the same material in principle. Consequently, it may be said that the detecting conductor in the PM sensor element disclosed in Patent Document 1 hardly satisfies both reduction in stress under the influence of temperature cycling (hereinafter, referred to as "improvement in temperature cycle resistance" as appropriate) and improvement in oxidation resistance. In other words, when the detection under the temperature cycling is performed by the PM sensor element disclosed in Patent Document 1, in the case of using some material (for example, Au) for an entire detecting conductor, it is difficult to reduce the influence of stress caused by temperature cycling detection, meanwhile in the case of using another material (for example, W), it becomes difficult to secure oxidation resistance at the high temperature detection.

In the PM sensor element disclosed in Patent Document 2, a detecting electrode and an extraction electrode are formed of different materials from each other. The extraction electrode is constituted of tungsten or molybdenum. However, the connection reliability at the joining portion between the portions formed of the different materials is concerned. Thus, even in the PM sensor element disclosed in Patent Document 2, it has been impossible to satisfy both improvement in temperature cycle resistance and oxidation resistance.

The present invention has been made in view of this background technology and it is an object of the invention to provide a particulate-matter detecting sensor element, in which compatibility between improvement in temperature cycle resistance and improvement in oxidation resistance can be achieved.

Means for Solving the Problems

According to one aspect of the present invention, a particulate-matter detecting sensor element for detecting particulate-matters in a gas to be measured includes:
  an insulating substrate having a detecting face to which particulate matters adhere;
  a plurality of detecting conductors formed in the insulating substrate, the detecting conductors having mutually different polarity; and
  a heating section formed at the insulating substrate; wherein
  each detecting conductor includes:
  a detecting electrode part at least partly exposed to the detecting face;
  a terminal part formed on an external surface of the insulating substrate and electrically connected to the detecting electrode part; and
  a connecting part that electrically connects the detecting electrode part and the terminal part, wherein
  at least a portion of the detecting conductor including the detecting electrode part is constituted of a noble metal conductor formed mainly of at least one noble metal selected from Pt, Au, Pd, Rh, and Ir;
  at least a portion of the connecting part is constituted of a low expansion conductor formed mainly of a low expansion coefficient metal which linear expansion coefficient is lower than that of the noble metal, and wherein
  the noble metal conductor and the low expansion conductor are joined at an overlapping part at which the noble metal conductor and the low expansion conductor are partly overlapped with each other on an insulating layer which forms the insulating substrate in a normal line direction of the insulating layer.

Effects of the Invention

According to the above-mentioned particulate-matter detecting sensor element, a portion of the detecting conductor including the detecting electrode part is constituted of the noble metal conductor. In other words, a portion of the detecting conductor exposed to the gas to be measured is constituted of the noble metal conductor and therefore, the oxidation resistance of the detecting conductor of the detecting conductor can be improved.

At least a portion of the connecting part is constituted of the low expansion conductor formed mainly of the low expansion coefficient metal which linear expansion coefficient is lower than that of the above-mentioned noble metal. Therefore, when the connecting part is subjected to temperature cycling, an influence of stresses caused by the expansion and contraction thereof can be reduced. The connecting part that is formed relatively in a wide range may receive stress caused by the expansion upon heating by heating section. Therefore, by using a low expansion conductor with a low linear expansion coefficient in at least a part of the connecting part of the detecting conductor, the temperature cycle resistance thereof can be effectively improved.

The noble metal conductor and the low expansion conductor are joined at an overlapping part at which the noble metal conductor and the low expansion conductor are partly overlapped with each other on an insulating layer which forms the insulating substrate in a normal line direction of the insulating layer. By this connection, the connection reliability at a joining portion between the noble metal conductor and the low expansion conductor can be improved. In other words, by providing the overlapping part, the joint area between the noble metal conductor and the low expansion conductor can be surely secured which may lead to release of stress concentration at the joining portion. As a result, the connection reliability at the joining portion between the noble metal conductor and the low expansion conductor can be improved.

By forming the structure of the detecting conductor as explained above, compatibility between the temperature cycle resistance and the oxidation resistance can be achieved.

As described above, according to the above aspect of the invention, a particulate-matter detecting sensor element can be provided which can achieve compatibility between improvement in temperature cycle resistance and improvement in oxidation resistance.

MODES FOR CARRYING OUT THE INVENTION

Figure 1:
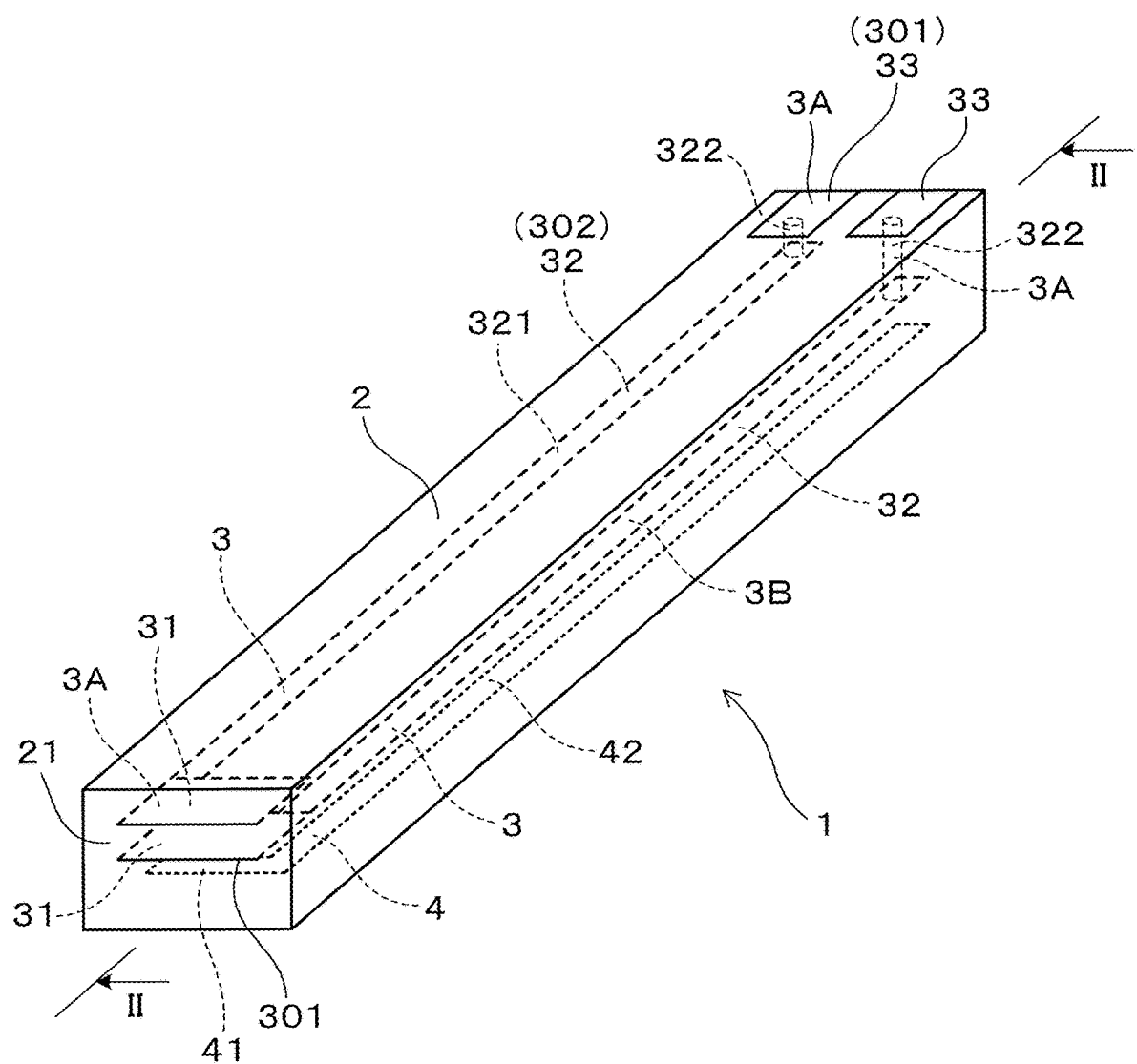
FIG. 1 is a perspective view of a particulate-matter detecting sensor element (PM sensor element) in Embodiment 1.

The noble metal conductor is formed mainly by at least one noble metal selected from Pt (platinum), Au (gold), Pd (palladium), Rh (rhodium), and Ir (iridium). It is noted that this phrase, "formed mainly by at least one noble metal selected from Pt, Au, Pd, Rh, and Ir" means that the total amount of Pt, Au, Pd, Rh, and Ir is 50% or more by mass with respect to the entire mass of the noble metal conductors. The noble metal conductor may contain only one element among the elements of Pt, Au, Pd, Rh, and Ir, or may contain plural numbers among these elements. Further, the noble metal conductor may contain ceramics such as alumina, etc. However, the noble metal conductor may be formed not to contain any ceramics such as alumina, etc. In case the noble metal conductor contains ceramics, the content amount thereof may preferably be 20% or less by weight.

The low expansion conductor is formed mainly by low expansion conductor formed mainly by a low expansion coefficient metal which linear expansion coefficient is lower than that of the selected noble metal. It is noted here that the phrase, "formed mainly by a low expansion coefficient metal" means that the total amount of the low expansion coefficient metal is 50% or more by mass with respect to the entire amount of the low expansion conductor The low expansion coefficient metal preferably is at least one metal selected from W and Mo. This is because the linear expansion coefficients of W and Mo are sufficiently lower than that of the noble metal. In addition, because each of W and Mo has a melting point higher than the noble metal conductor, W and Mo can improve not only the temperature cycle resistance but also the heat resistance and the strength in the detecting conductor.

The low expansion conductor may contain either one of W and Mo or both thereof. Further, the noble metal conductor may contain ceramics such as alumina, etc. However, the noble metal conductor may be formed not to contain any ceramics such as alumina, etc. In case the noble metal conductor contains ceramics, the content amount thereof may preferably be 20% or less by weight.

It is noted that "noble metal" referred to in this specification includes Pt, Au, Pd, Rh, and Ir. In addition, the linear expansion coefficient of the low expansion coefficient metal is lower than the linear expansion coefficient of the noble metal (i.e., Pt, Au, Pd, Rh, and Ir).

In this regard, the linear expansion coefficient is a value determined by measurement performed at a temperature of 20° C. in accordance with JIS (Japanese Industrial Standards) Z 2285 (2003 Method for measuring linear expansion coefficients of metal materials). As one example, the linear expansion coefficients of the metals are W: $4.5 \times 10^{-6}$/K, Mo: $4.0 \times 10^{-6}$/K, Pt: $8.8 \times 10^{-6}$/K, Au: $14.2 \times 10^{-6}$/K, Pd: $11.8 \times 10^{-6}$/K, Rh: $8.2 \times 10^{-6}$/K, Ir: $6.2 \times 10^{-6}$/K.

It is preferable that the terminal part of the detecting conductor is constituted of the noble metal conductor. In such case, the oxidation resistance at the terminal part can be improved. Since the terminal part is exposed to the element external surface, by forming this portion of the noble metal conductor, the oxidation resistance at the detecting conductor can be further improved. In addition, for the PM sensor element, it is desired to perform sensing at a position closer to the center of an exhaust pipe in comparison to other sensor elements, for example, such as a gas sensor, etc. Accordingly, in the PM sensor element, not only a detecting electrode part but also a terminal part tends to be exposed to high temperatures. Therefore, in a PM sensor element, there is a tendency to require high heat resistance and oxidation resistance not only at the detecting electrode part but also at the terminal part. And so, by constituting the terminal part of a noble metal conductor, the heat resistance and oxidation resistance the terminal part can be improved to thereby meet the needs of the markets.

Further, the low expansion conductor may be formed inside of the insulating substrate. In such case, more effectively the compatibility between the temperature cycle resistance and the oxidation resistance can be achieved. This is because by arranging the low expansion conductor inside the insulating substrate, the low expansion conductor is less exposed to the gases including oxygen to thereby easily improve oxidation resistance of the detecting conductor. On the other hand, the inside temperature of the insulating substrate may easily rise upon heating by the heating section. Therefore, by forming the low expansion conductor of the detecting conductor inside the insulating substrate, the temperature cycle resistance can be effectively improved.

Further, the insulating layer may be formed in a plural number, a plurality of the insulating layers having the detecting electrode part formed therebetween, and the detecting face may be formed on an end surface of the insulating substrate in a direction orthogonal to a laminated direction of the plurality of the insulating layers. This structure can further improve the oxidation resistance of the detecting conductor. In other words, when the detecting electrode part is provided between the respective insulating layers, each detecting electrode part is in a state held therebetween from the laminated direction. Upon sintering process of the insulating layers, the detecting electrode parts are compressed in the laminated direction. As a result, the fine pores in the particulates of the detecting electrode part become more finer to thereby prevent gases from entering thereinto. This eventually protects the low expansion conductor arranged inside of the insulating substrate. Accordingly, the oxidation resistance of the detecting conductor can be improved.

Further, the detecting conductor includes an inner layer conductor formed between each of the plurality of the insulating layers and an outer layer conductor formed on the external surface of the insulating substrate in the laminated direction, and an interlaminar via which interlayer-connects the inner layer conductor and the outer layer conductor is formed. The via conductor in the interlaminar via is formed of the noble metal conductor. In such case, both of the outer layer conductor and the via conductor are formed of the noble metal conductor to improve connection reliability therebetween.

In addition, a portion of the inner layer conductor which is directly connected to the interlaminar via connected to the outer layer conductor may be formed of the noble metal conductor. In this case, joint between the via conductor and the inner layer conductor is made by mutual joint of the noble metal conductors, and thus connection reliability therebetween can be improved.

In addition, the overlapping part preferably includes a solid solution layer formed by the noble metal and the low expansion coefficient metal. In this case, the stress concentration on the joint interface therebetween can be further reduced to thereby improve the connection reliability.

In addition, the terminal part is preferably constituted of the noble metal conductor that is porous. In this case, contact resistance between the terminal part and an external electrode can be reduced to thereby improve the electrical connection reliability. Further, the stress between the terminal part and the insulating substrate can be reduced. As a result, adhesion of the terminal part to the insulating substrate can be further improved.

In addition, at least a portion of an area between the connecting part and the terminal part formed of the low expansion conductor of the detecting conductor is preferably constituted of the noble metal conductor with closed pores. In this case, it is possible to prevent a gas from entering into the low expansion conductor to thereby reduce the stress against the insulating substrate. It is noted that the phrase of "closed pore noble metal conductor" means the noble metal conductor having pores which are not in communication with the insulating substrate.

Embodiment 1

An embodiment of a particulate-matter detecting sensor element (i.e., a PM sensor element) will be described with reference to the attached drawings.

A PM sensor element 1 of the present embodiment is an element which detects particulate-matters in a gas to be measured.

Figure 2:
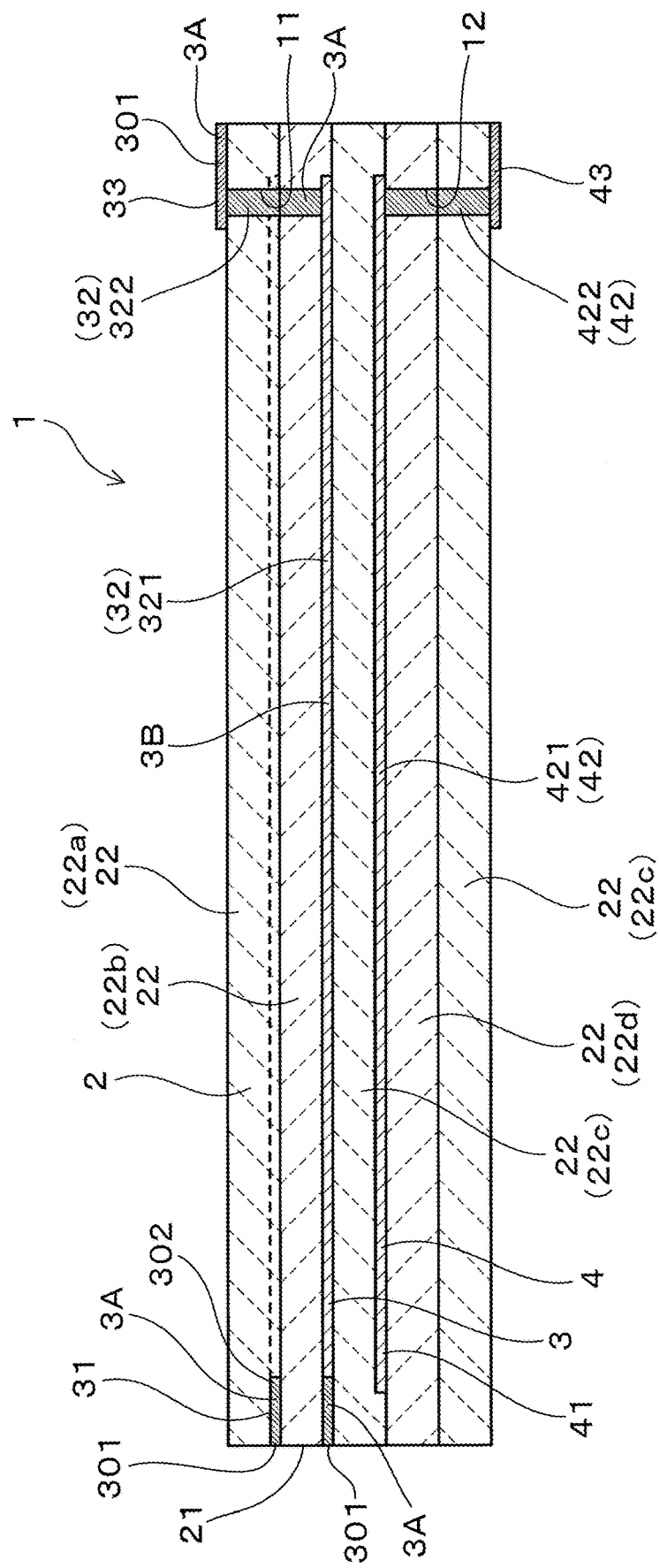
FIG. 2 is an explanatory cross-sectional view taken along line II-II in FIG. 1.
Figure 3:
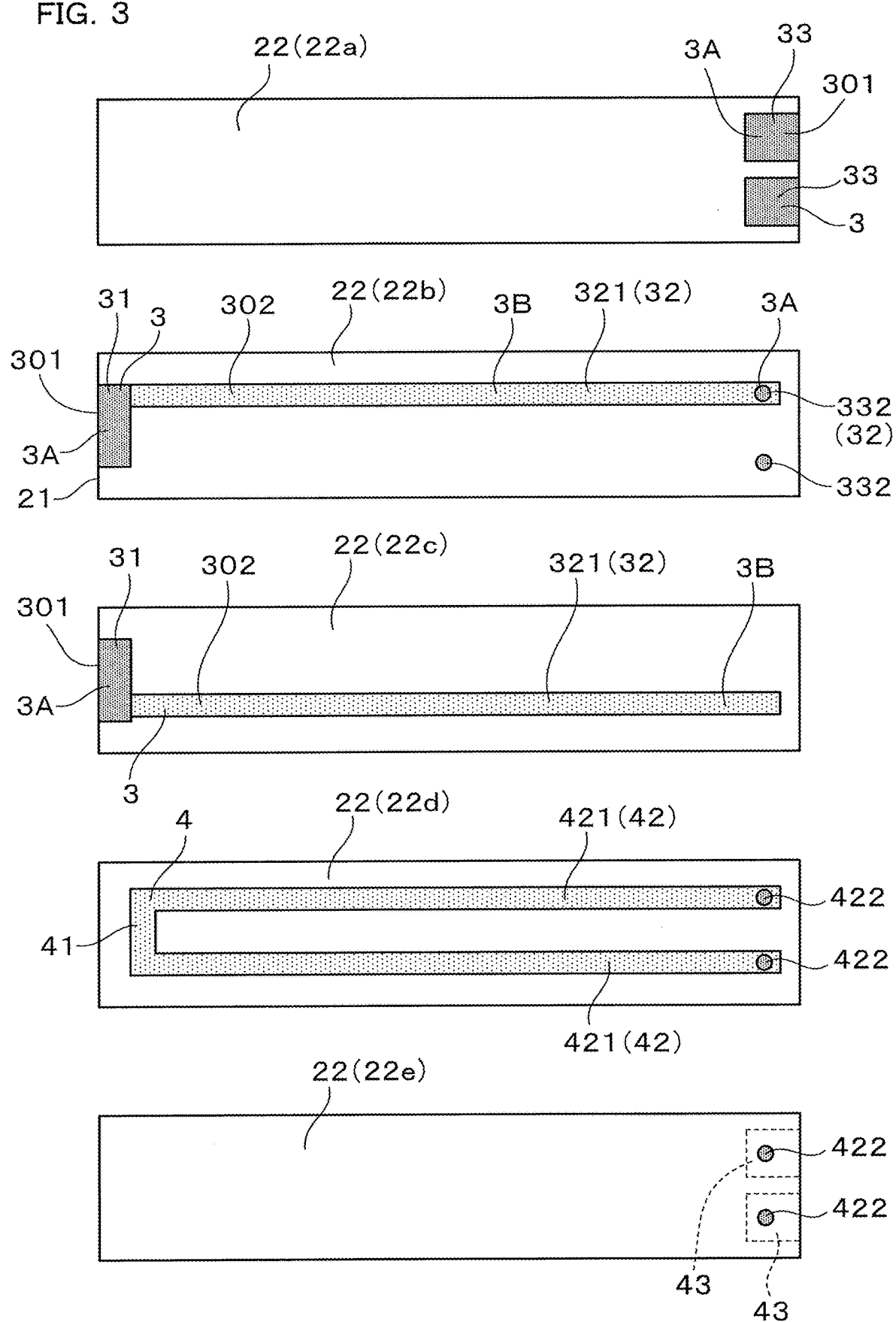
FIG. 3 is an exploded plan view of the PM sensor element in Embodiment 1.

The PM sensor 1 includes, as shown in FIGS. 1-3, an insulating substrate 2, detecting conductors 3, and a heating section 4 formed in the insulating substrate 2. The PM sensor element 1 includes a plurality of the detecting conductors 3 having mutually different polarity. The insulating substrate 2 has a detecting face 21 to which particulate matters adheres.

Each detecting conductor 3 includes a detecting electrode part 31, a terminal part 33, and a connecting part 32. The detecting electrode part 31 is at least partly exposed on the detecting face 21. The terminal part 33 is formed on an external surface of the insulating substrate 2 and is electrically connected to the detecting electrode part 31. The connecting part 32 electrically connects the detecting electrode part 31 and the terminal part 33.

A portion of the detecting conductor 3 including the detecting electrode part 31 is constituted of a noble metal conductor 3A formed mainly by at least one noble metal selected from Pt, Au, Pd, Rh, and Ir.

A portion of the connecting part 32 of the detecting conductor 3 is constituted of a low expansion conductor 3B formed mainly by a low expansion coefficient metal which linear expansion coefficient is lower than that of the selected noble metal. In this embodiment, the low expansion coefficient metal includes at least one metal selected from W and Mo.

Figure 4:
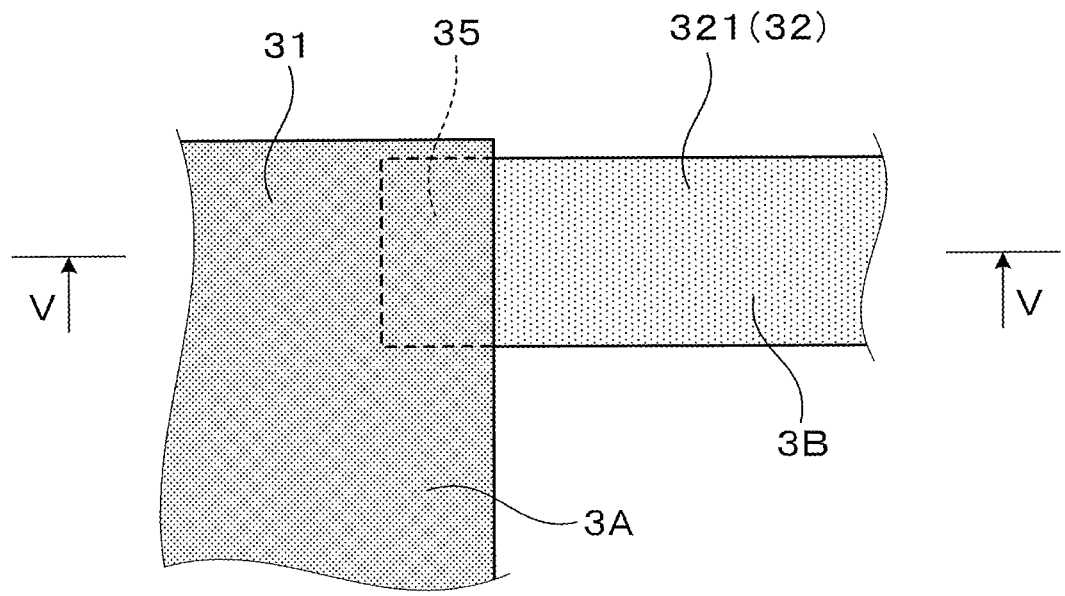
FIG. 4 is an explanatory plan view of a terminal part between a detecting electrode part and an elongated wiring portion in Embodiment 1.
Figure 5:
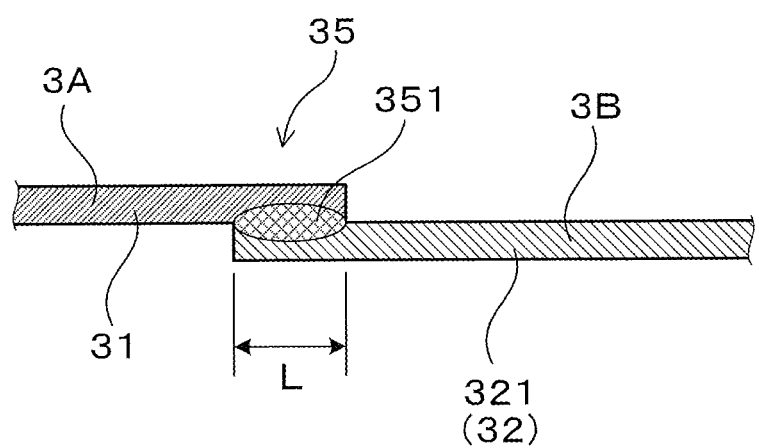
FIG. 5 is a cross-sectional view taken along line V-V in FIG. 4.

As shown in FIGS. 4 and 5, the noble metal conductor 3A and the low expansion conductor 3B are joined at the overlapping part 35 at which the noble metal conductor 3A and the low expansion conductor 3B are partly overlapped with each other on the insulating layer 22 which forms the insulating substrate 2 in a normal line direction of the insulating layer 22.

As shown in FIGS. 1 and 2, the detecting conductor 3 includes the exposed conductor part 301 which is exposed to the element surface and the non-exposed conductor 302 which is not exposed to the element surface. The low expansion conductor 3B is formed inside of the insulating substrate 2. In other words, the low expansion conductor 3B forms at least a part of the non-exposed conductor part 302.

As shown in FIGS. 2 and 3, the terminal part 33 of the detecting conductor 3 is formed of the noble metal conductor 3A. In this embodiment, the detecting electrode part 31 and the terminal part 33 are formed of the noble metal conductor 3A, and the connecting part 32 includes the low expansion conductor 3B. The entire terminal part 33 forms the exposed conductor part 301 and is composed of the noble metal conductor 3A. Further, in the detecting electrode part 31, a part of the detecting electrode part 31, which is exposed on the detecting face 21, forms the exposed conductor part 301, and the rest part forms the non-exposed conductor part 302. The detecting electrode part 31 including the non-exposed conductor part 302 is entirely composed of the noble metal conductor 3A. Further, the connecting part 32 is not entirely composed of the low expansion conductor 3B but is partly composed of the noble metal conductor 3A. Detail structure will be described later.

The insulating substrate 2 is formed in an elongated shape, and the connecting part 32 has an elongated wiring portion 321 that is formed along a longitudinal direction of the insulating substrate 2. The elongated wiring portion 321 is formed of the low expansion conductor 3B.

The PM sensor element 1 according to this embodiment has, as shown in FIG. 1, an elongated and nearly rectangular parallelepiped shape. The insulating substrate 2 may be formed of, for example, ceramics mainly including alumina ($Al_2O_3$). The outer contour of this insulating substrate 2 is in a nearly rectangular parallelepiped shape.

As shown in FIGS. 2 and 3, the insulating substrate 2 is composed of a plurality of laminated insulating layers 22. The detecting electrode part 31 is formed between two of the plurality of laminated insulating layers 22. The detecting face 21 is formed on one end of the plurality of laminated insulating layers 22 in a direction orthogonal to the laminated direction. In this embodiment, the detecting face 21 is formed on one end face of the insulating substrate 2 in the longitudinal direction.

Hereinafter, one end side in the longitudinal direction of the insulating substrate 2 on which the detecting face 21 is provided is referred to as a front end side, and the opposite side is referred to as a base end side. It is noted that FIG. 3 is an explanatory plan view of the exploded insulating layers 22 of the PM sensor element 1 viewed from the laminated direction. Among the external surfaces of the insulating substrate 2, an external surface facing in the laminated direction has the broadest area and this surface is referred to as a principal surface as appropriate.

In addition, the terminal part 33 is formed on the base end portion of the insulating substrate 2. The terminal part 33 is formed on the base end portion of the principal surface of the insulating substrate 2. In addition, the connecting part 32 is formed so as to connect the detecting electrode part 31 and the terminal part 33 that are respectively arranged on both end portions of the insulating substrate 2 in the longitudinal direction. Portions of the connecting part 32 form the inner layer conductors positioned between two of the plurality of laminated insulating layers 22.

The PM sensor element 1 has the inner layer conductor as the non-exposed conductor part 302. In addition, the detecting conductor 3 has the outer layer conductor formed on the external surface of the insulating substrate 2 in the laminated direction as the exposed conductor part 302. An interlaminar via 11 is provided between the inner layer conductor and the outer layer conductor to interlayer-connect both of the conductors. A via conductor 322 in the interlaminar via 11 is formed of a noble metal conductor 3A.

In this embodiment, the connecting part 32 includes the elongated wiring portion 321 and the via conductor 322. The elongated wiring portion 321 is part of the inner layer conductor. The inner layer conductor includes the elongated wiring portion 321 and the detecting electrode part 31 that is connected to the end of the elongated wiring portion 321. As described above, the via conductor 322 as a part of the connecting part 32 is formed of the noble metal conductor 3A. A portion of the elongated wiring portion 321 of the connecting part 32 other than the via conductor 322 is formed of the low expansion conductor 3B.

Connection between the detecting electrode part 31 and the elongated wiring portion 321 is the connection between the noble metal conductor 3A and the low expansion conductor 3B. As shown in FIGS. 4 and 5, the noble metal conductor 3A and the low expansion conductor 3B are joined at an overlapping part 35 at which the noble metal conductor 3A and the low expansion conductor 3B are partly overlapped with each other between two mutually adjacently positioned laminated insulating layers 22 in a thickness direction thereof. In other words, in this embodiment, the detecting electrode part 31 and the elongated wiring portion 321 are joined by the overlapping part 35.

The length L of the elongated wiring portion 321 at the overlapping part 35 in the longitudinal direction can be, for example, set to the length of about 1-120 times longer than the thickness of the noble metal conductor 3A.

Figure 6:
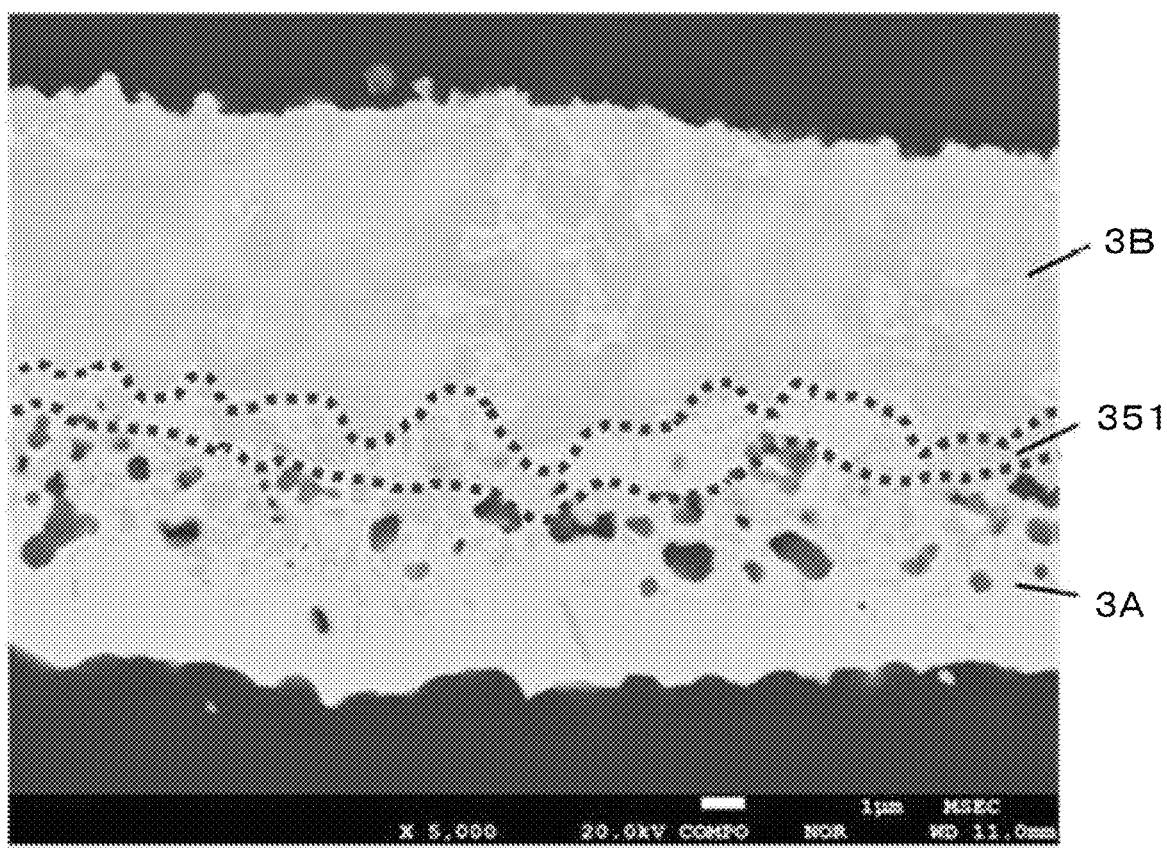
FIG. 6 is a photograph of the cross-section of an overlapping part in Embodiment 1 (about 5000 times enlarged).

The overlapping part 35 includes a solid solution layer 351 formed by the noble metal and the low expansion coefficient metal. In FIG. 6, the cross section of the overlapping part 35 is shown by photograph. It can be confirmed that the solid solution layer 351 is formed between the Pt of noble metal and W of low expansion coefficient metal. It is noted that on the photograph, the area enclosed by the broken line indicates the existence of the solid solution layer 351, marked by the inventors of this application.

As shown in FIGS. 1 to 3, the PM sensor element 1 has a built-in heating section 4. In other words, the heating section 4 is formed inside the insulating substrate 2. The heating section 4 is formed in the interface between two of the plurality of the insulating layers 22. The heating section 4 may also be formed of the above-mentioned low expansion conductor 3B. The heating section 4 includes a heat generating part 41 and a pair of lead parts 42 connected to the heat generating part 41.

Each lead part 42 is connected correspondingly to each of a pair of terminal parts 43 for heater each exposed on the element surface. The lead part 42 includes an elongated wiring portion 421 as an inner layer conductor, and a via conductor 422 that connects the elongated wiring portion 421 and the terminal part 43.

The pair of terminal parts 43 for heater is formed on the principal surface opposite to the side on which the terminal part 33 of the detecting conductor 3 is disposed. The terminal parts 43 for heater are disposed on the base end portion of the insulating substrate 2, and the heat generating part 41 is disposed around the tip end portion of the insulating substrate 2.

By energizing the heating section 4, the heat generating part 41 generates heat to thereby heat the PM sensor element 1. The PM sensor element 1 can be placed, for example, in an exhaust system for an internal combustion engine to detect the amount of PM in the exhaust gas. When detecting PM, as described above, the heating section 4 is energized, and the PM sensor element 1 is heated to, for example, to the temperature of approximately 600-800° C.

Then, under such state, a specified voltage is applied between the plurality of detecting conductors 3 having mutually different polarity. In other words, the specified voltage is applied between a pair of terminal parts 33. Thus, the PM amount can be detected on the basis of the resistance variations between the plurality of detecting electrode parts 31 exposed to the detecting face 21.

Next, one example of manufacturing method of the PM sensor element 1 of the present embodiment will be described.

The PM sensor element 1 can be manufactured by performing a series of processes which are a green sheet molding process, a through hole forming process, a pattern printing process, degreasing and sintering processes, an outer shape machining process, and a pad forming process, which will be explained below.

(Green Sheet Molding Process)

The insulating substrate 2 can be prepared using a ceramic green sheet (hereinafter, referred to as "a green sheet" as appropriate) obtained by molding a raw material composition composed of a ceramic material, a binder resin, etc.

Oxide ceramics, nitride ceramics, carbide ceramics, etc. are examined as the ceramic material. Aluminum nitride, silicon nitride, boron nitride, titanium nitride, etc. are examined as the nitride ceramic. Silicon carbide, zirconium carbide, titanium carbide, tantalum carbide, tungsten carbide, etc. are examined as the carbide ceramic. Alumina, zirconia, cordierite, mulite, etc. are examined as the oxide ceramic. Among these examples, the ceramic containing alumina is preferably used.

As the binder resin, an acrylic resin, an epoxy resin, or the like can be used.

In addition, a solvent can be used to adjust the viscosity, and as the solvent, acetone, ethanol, etc. can be used.

Further, a sintering aid can be added. As the sintering aid, an inorganic oxide such as $SiO_2$, MgO, CaO, etc. can be used.

First, a ceramic material, a binder resin, etc. as the raw material composition for the green sheet are mixed to obtain a green sheet molding material. As one example of the raw material composition of the green sheet, a paste containing 70-90% by weight of $Al_2O_3$ particles, the binder resin and a solvent can be used. A green sheet can be obtained by molding the green sheet molding material into a specified shape by a screen printing, a doctor blade method, etc., and drying the material.

A plurality of the green sheets having approximately the same shape are prepared.

(Through Hole Forming Process)

Figure 7:
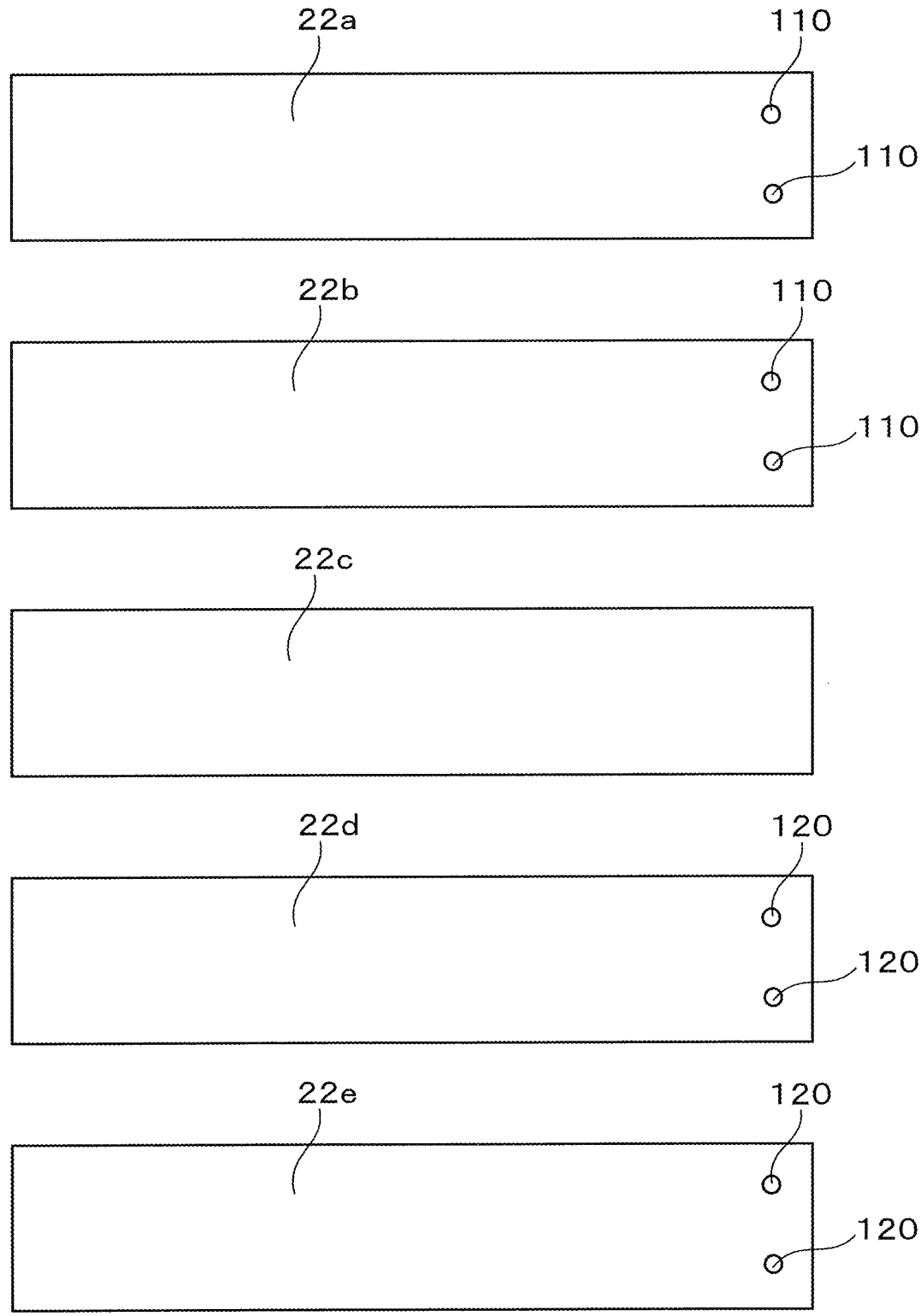
FIG. 7 is an illustration of a manufacturing method of the PM sensor element in Embodiment 1, which includes plan views of a plurality of green sheets.

As shown in FIG. 7, among green sheets 22a to 22e that are obtained by the above-mentioned green sheet molding process, the green sheets 22a, 22b, 22d, and 22e are provided with through holes 110 and 120 passing through the sheet in the thickness direction. The through holes 110 and 120 form interlaminar vias 11 and 12 respectively.

The through holes 110 and 120 can be formed by punching, drilling, or laser irradiation, etc. In terms of dimensional accuracy of the inner diameter of the through holes, the through holes 110 and 120 are preferably formed by punching.

(Pattern Printing Process)

A wiring pattern that forms the detecting conductor 3 or the heating section 4 is formed on the green sheets 22a to 22e, on which the through holes 110 and 120 obtained by the through hole forming process have been formed, by printing with a conductive paste.

As the conductive paste to be used in pattern printing process, a conductive paste composed of metal particles, ceramic powder, binder resin, etc. is preferably used. As the examples of the binder resin, acrylic resin, epoxy resin, etc. are raised. As the examples of the solvent, acetone, ethanol, etc. are raised. The average particle size of the metal particles contained in the conductive paste is preferably 0.1-10 μm. The average particle size of the metal particles is preferably 0.1 μm or more from the viewpoint of moldability of the wiring pattern and is preferably 10 μm or less from the viewpoint of moldability of the wiring pattern and reducing of variation in the electrical resistance of the wiring pattern. Further, as the ceramic powder, for example, alumina powder is preferably used. The average particle size of the alumina powder may be set to, for example, approximately 0.1-10 μm, and the content of the alumina powder may be set to approximately 1 to 15% by weight.

The conductive paste to be used in this pattern printing process is categorized into a conductive paste for the noble metal conductor 3A, a conductive paste for the low expansion conductor 3B, and a conductive paste for the heating section 4.

As the metal particles contained in the conductive paste for the noble metal conductor 3A, a noble metal selected mainly from Pt, Au, Pd, Rh, and Ir may be used.

As the metal particles contained in the conductive paste for the low expansion conductor 3B, a metal selected mainly from W and Mo may be used.

As the metal particles contained in the conductive paste for the heating section 4, a metal selected from W and Mo may be used.

The conductive paste for the low expansion conductor 3B of the detecting conductor 3 and the conductive paste for the heating section 4 may have the same composition.

In this pattern printing process, a mask having a screen mesh and having holes formed in a predetermined wiring pattern is used. A wiring pattern is printed on the green sheets 22a to 22e having the mask set, by using a squeegee (see FIG. 3). The thickness of the printed conductive paste layer is preferably 10-100 μm. The thickness of the printed conductive paste layer is preferably 10 μm or more from the viewpoint of detectability and is preferably 100 μm or less from the viewpoint of lamination forming.

On the green sheet 22a, a pattern of the terminal part 33 of the detecting conductor 3 is printed. This pattern printing is performed with the conductive paste for the noble metal conductor 3A.

On the green sheets 22b and 22c, pattern printing of the inner layer conductor of the detecting conductor 3 is performed. In other words, patterns of the detecting electrode part 31 and the connecting part 32 of the elongated wiring portion 321 are printed on the green sheets 22b and 22c.

In the pattern printing of the inner layer conductor of the detecting conductor 3, for example, first, the detecting electrode part 31 is printed with the conductive paste for the noble metal conductor 3A, and then the elongated wiring portion 321 is printed with the conductive paste for the low expansion conductor 3B. Alternatively, first, the elongated wiring portion 321 is printed with the conductive paste for the low expansion conductor 3B and then the detecting electrode part 31 is printed with the conductive paste for the noble metal conductor 3A.

At this time, the printing is performed so as to form the overlapping part 35 at which the detecting electrode part 31 and the elongated wiring portion 321 are to be partly overlapped with each other (see FIGS. 4 and 5).

On the green sheet 22*d*, pattern printing of the heating section 4 is performed. In this pattern printing, the same conductor paste as the conductive paste for the low expansion conductor 3B can be used as described above.

On the green sheet 22*e*, pattern printing of the terminal parts 43 for heater is performed. In this pattern printing, the same conductor paste as the conductive paste for the noble metal conductor 3A can be used.

It is noted that the through holes 110 and 120 in each green sheet 22*a*, 22*b*, 22*c*, 22*d*, and 22*e* are filled with the conductors. Specifically, the conductor for constituting the via conductor 322 is filled into the through holes 110 of the green sheets 22*a* and 22*b*, and the conductor for constituting the via conductor 422 is filled into the through holes 120 of the green sheets 22*d* and 22*e*. To form these conductors, the conductive paste for the noble metal conductor 3A may be used.

The conductors in the through holes 110 and 120 may be formed by filling the conductive paste thereinto at the same time when printing the wiring pattern on the surface of each of the green sheets 22*a* to 22*e*, or may be formed separately from the wiring pattern printing.

In this way, as shown in FIG. 3, the conductor pattern is printed on each of the green sheets 22*a* to 22*e*. By drying the pattern-printed green sheets 22*a* to 22*e*, the conductive paste formed on the green sheets 22*a* to 22*e* is dried. The drying conditions include, for example, drying at 40-130° C. for 1-60 minutes.

(Laminating Process)

The green sheets 22*a* to 22*e* (see FIG. 3) each having a pattern formed in the pattern printing process are appropriately laminated. In this way, a laminated body of the green sheets 22*a* to 22*e* having the conductive paste formed thereon can be obtained.

(Degreasing and Sintering Processes)

The laminated body obtained in the laminating process is degreased and sintered.

The degreasing process can be performed, for example, at 80-800° C. for 1-30 hours in an N2-containing atmosphere or a humidified H2O/H2 atmosphere. The sintering process is preferably performed, for example, at 1000-1600° C. for 1-40 hours in an inert atmosphere.

The degreasing and sintering processes is preferably performed in a pressurized state in the laminated direction in order to improve adhesion of the insulating layers 22.

(Outer Shape Machining Process)

To shape the outer peripheral end face of the insulating substrate 2 formed of the laminated insulating layers 22 and adjust the dimension of the insulating substrate 2, an outer shape machining process is performed.

(Pad Forming Process)

A conductive paste such as Pt having borosilicate glass mixed therein is printed on the terminal part 43 for heater which is exposed from the insulating substrate 2 in order to prevent deterioration of the terminal part 43 for heater. And then, sintering is performed at 800 to 1000° C.

Next, function and advantageous effects of the present embodiment will be explained.

In the particulate-matter detecting sensor element 1, a portion of the detecting conductor 3 including the detecting electrode part 31 is formed of the noble metal conductor 3A. In other words, the portion of the detecting conductor 3 which is exposed to the gas to be measured is formed of the noble metal conductor 3A to thus improve the oxidation resistance of the detecting conductor 3 as a whole.

At least a portion of the connecting part 32 is constituted of the low expansion conductor 3B mainly formed of a low expansion coefficient metal which linear expansion coefficient is smaller than that of the noble metal. Therefore, when the connecting part 32 is exposed to the temperature cycle, an influence of stress generated due to the expansion and compression can be reduced. In other words, the connecting part 32 which is formed in relatively wide range may tend to receive the influence of the stress due to the expansion upon heating by the heating section. Accordingly, by forming at least of a portion of the connecting part 32 of the detecting conductor 3 of the low expansion conductor 3B which linear expansion coefficient is small, the temperature cycle resistance performance can be effectively improved.

The noble metal conductor 3A and the low expansion conductor 3B are joined at the overlapping part 35 at which the noble metal conductor 3A and the low expansion conductor 3B are partly overlapped with each other on the insulating layer 22 which forms the insulating substrate 2 in a normal line direction of the insulating layer 22. By this connection, the connection reliability at the joining portion between the noble metal conductor 3A and the low expansion conductor 3B can be improved. In other words, by providing the overlapping part 35, the joint area between the noble metal conductor 3A and the low expansion conductor 3B can be surely secured which may lead to release of stress concentration at the joining portion. As a result, the connection reliability at the joining portion between the noble metal conductor 3A and the low expansion conductor 3B can be improved.

By forming the structure of the detecting conductor 3 as explained above, the compatibility between the temperature cycle resistance and the oxidation resistance can be achieved.

The terminal part 33 of the detecting conductor 3 is formed of the noble metal conductor 3A. This can improve the oxidation resistance of the terminal part 33. Since the terminal part 33 is an exposed conductor part 301, by forming this portion by the noble metal conductor 3A, the oxidation resistance of the detecting conductor 3 can be further improved.

Further, the low expansion conductor 3B is formed inside of the insulating substrate 2. This can achieve compatibility between the temperature cycle resistance and the oxidation resistance more effectively. This is because by arranging the low expansion conductor 3B inside the insulating substrate 2, the low expansion conductor 3B is less exposed to the gases containing oxygen to thereby easily improve oxidation resistance of the detecting conductor 3. On the other hand, however, the inside temperature of the insulating substrate 2 may easily rise upon heating by the heating section 4. Therefore, by forming the low expansion conductor 3B inside portion of the detecting conductor 3 in the insulating substrate 2, the temperature cycle resistance can be effectively improved.

Further, the detecting electrode part 31 is provided between the plurality of insulating layers 22, and the detecting face 21 is formed at an end surface of the insulating substrate 2 in the orthogonal direction a laminated direction of the plurality of insulating layers 22, thereby to improve further the oxidation resistance of the detecting conductor 3. In other words, the detecting electrode part 31 disposed between the plurality of insulating layers 22 is sandwiched and held securely from the laminated direction. Therefore, upon sintering the insulating layers 22, the detecting electrode part 31 is compressed in the laminated direction. As a result, the fine pores between the particulates of the detecting electrode part 31 can be compressed to become further finer to thereby effectively prevent gas from entering thereinto. This can protect the low expansion conductor 3B in the insulating substrate 2. Accordingly, the oxidation resistance of the detecting conductor 3 can be improved.

Further, the via conductor 322 is formed of the noble metal conductor 3A, and therefore, the connection reliability between the outer layer conductor and the via conductor 322 can be improved. In other words, although the via conductor 322 is covered by the outer layer conductor (in this embodiment, terminal part 33) to form the non-exposed conductor part 302, gas may enter from the fine pores of the outer layer conductor and may further enter to reach the interface between the outer layer conductor and the via conductor 322. In order to prevent this, the via conductor 322 is formed of the noble metal conductor 3A to improve the oxidation resistance and eventually improve connection reliability. Still further, by forming the terminal part 33 and the via conductor 322 by the same kind noble metal conductor 3A, the connection reliability therebetween can be further improved.

Further, the overlapping part 35 is provided with a solid solution layer 351 formed of the noble metal and the low expansion coefficient metal. This configuration can further reduce the stress concentration on the joint interface between the noble metal conductor 3A and the low expansion conductor 3B thereby to improve the connection reliability therebetween.

In view of the oxidation resistance improvement, it is preferable to select the noble metal for the noble metal conductor 3A, particularly from at least one of Pt, Rh and Ir. Further, in view of further improvements in oxidation resistance and temperature cycle resistance, it is preferable to use the noble metal conductor 3A mainly formed of Pt and the low expansion conductor 3B mainly formed by W.

As stated above, according to the embodiment, a particulate-matter detecting sensor element which can improve both temperature cycle resistance and oxidation resistance can be provided.

Embodiment 2

Figure 8:
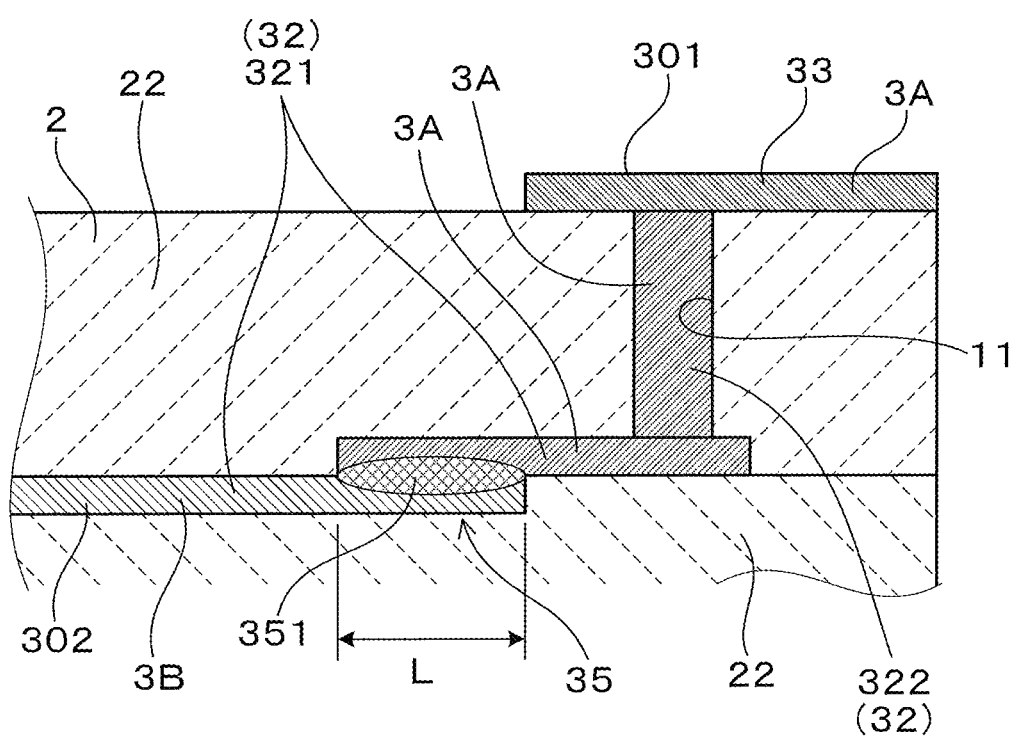
FIG. 8 is an explanatory cross-sectional view of a base end portion of the elongated wiring portion, a via conductor, and a terminal part in Embodiment 2.

This embodiment shows the PM sensor element 1, wherein a portion of the inner layer conductor directly connected to an interlaminar via 11 which is connected to the outer layer conductor is formed of the noble metal conductor 3A, as shown in FIG. 8.

In other words, a portion of the base end side of the elongated wiring portion 321 which corresponds to the inner layer conductor is formed of the noble metal conductor 3A. This portion of the elongated wiring portion 321 formed of the noble metal conductor 3A is connected to the via conductor 322. The via conductor 322 is formed of the noble metal conductor 3A, as is the same with Embodiment 1. It is preferable for the via conductor 322 and the portion of the elongated wiring portion formed of the noble metal conductor 3A to be formed of the same noble metal.

The connection between the noble metal conductor 3A and the low expansion conductor 3B in the elongated wiring portion 321 is made at the overlapping part 35. In other words, the overlapping part 35 is formed of the noble metal conductor 3A at the base end portion of the elongated wiring portion 321 and the low expansion conductor 3B at the tip end side overlapping each other in the laminated direction.

This overlapping part 35 can be formed as same as the overlapping part 35 between the tip end portion of the elongated wiring portion 321 and the detecting electrode part 31 according to Embodiment 1. The length L of the overlapping part 35 of the elongated wiring portion 321 is twice or more of the thickness of the noble metal conductor 3A. It is preferable to set the length L of the overlapping part 35 to be equal to or more than the inner diameter of the interlaminar via 11. It is noted that the interlaminar via 11 and the overlapping part 35 are not overlapped with each other in the laminated direction.

Other structures are the same as those of Embodiment 1. It is noted here that the numerals or symbols already used for the structural parts or elements in the previous embodiment will be used for the same structural parts or elements in the explanation of Embodiment 2 and thereafter, unless otherwise indicated.

According to the embodiment, the connection reliability between the via conductor 322 and the inner layer conductor (i.e., elongated wiring portion 321) can be improved. The area of joint between the via conductor 322 formed of the noble metal conductor 3A and the inner layer conductor (elongated wiring portion 321) becomes equal to or less than the opening area of the interlaminar via 11 and therefore the size of the joint area is variable depending on the size of the interlaminar via 11 and the size of the joint area may have an upper limit. Accordingly, if the connection between the via conductor 322 and the elongated wiring portion 321 is made by the connection between the noble metal conductor 3A and the low expansion conductor 3B, it may be disadvantageous for the connection reliability. Accordingly, such problem can be solved by connecting the noble metal conductor 3A with the same noble metal conductor 3A to improve the connection reliability of the detecting conductor 3.

Other structures are the same with those of Embodiment 1.

Embodiment 3

Figure 9:
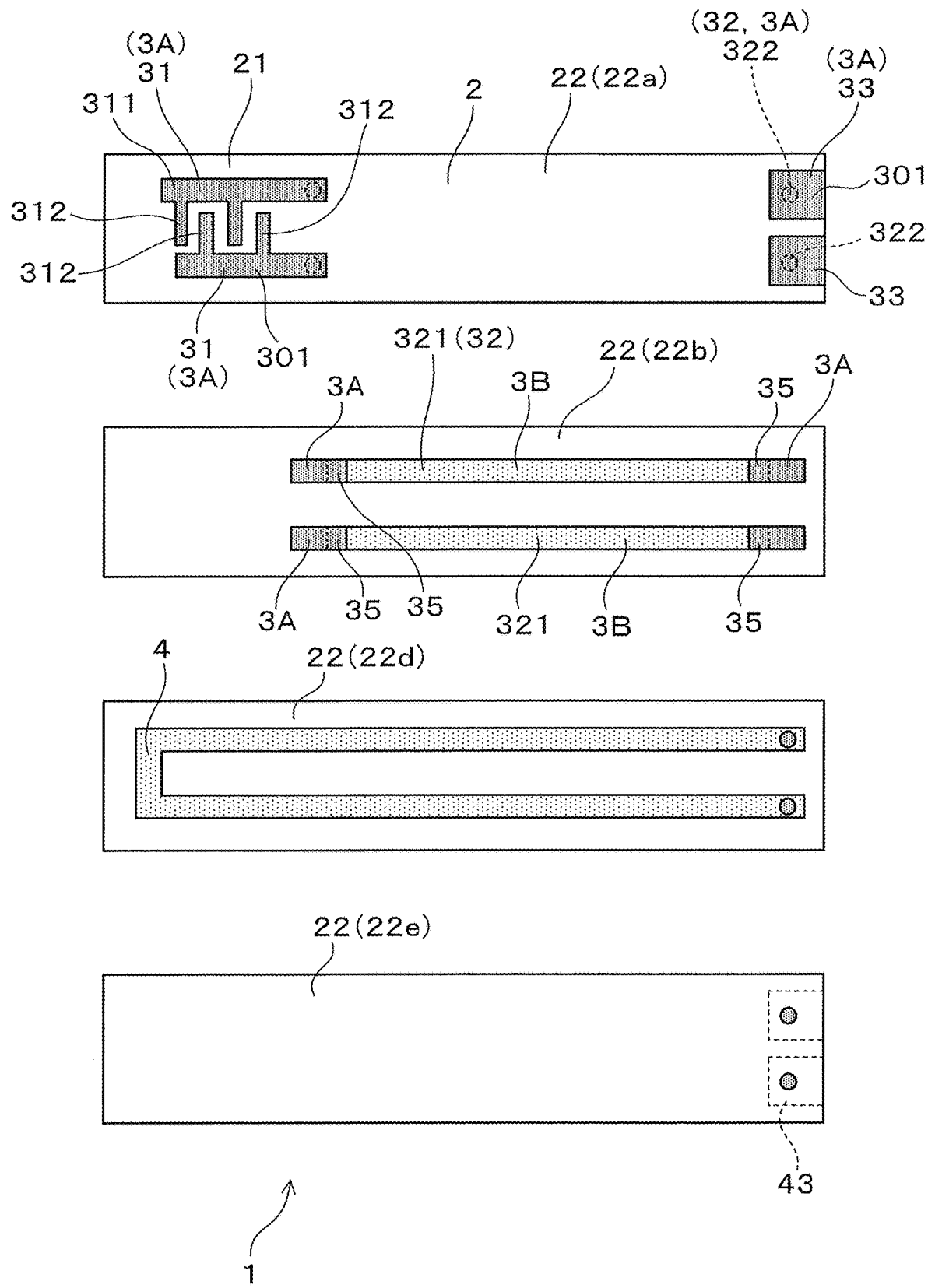
FIG. 9 is an exploded plan view of a PM sensor element in Embodiment 3.

As shown in FIG. 9, this embodiment shows the PM sensor element 1 provided with a detecting face 21 on the principal surface of the insulating substrate 2 facing in the laminated direction. FIG. 9 is an explanatory exploded view of the PM sensor element 1 exploded at the interface of the insulating layers 22. The symbols 22a, 22b, 22d, and 22e shown in FIG.9 approximately correspond to the symbols 22a, 22b, 22d and 22e, which indicate the green sheets explained in the manufacturing process of Embodiment 1. However, the patterns of the detecting conductor 3 formed on the green sheets 22a and 22b are different from the patterns in the Embodiment 1.

The detecting electrode part 31 of the detecting conductor 3 is provided on the principal surface of the insulating substrate 2. Two different polarity detecting electrode parts 31 are arranged on the same principal surface of the insulating substrate 2 with a predetermined distance apart from each other.

Each detecting conductor 3 is arranged approximately in comb teeth shape, i.e., each detecting electrode part 31 has a base portion 311 provided along the insulating substrate 2 in a longitudinal direction and a plurality of branched portions 312 which branches off from the base portion 311 and projects inwardly. The plurality of branched portions 312 of the detecting electrode part 31 is arranged alternately with the plurality of branched portions 312 of the other detecting electrode 31 having a predetermined distance apart from each other in a longitudinal direction of the insulating substrate 2.

Similar to Embodiment 1, the terminal part 33 of each detecting conductor 3 is formed at the base end portion of the principal surface of the insulating substrate 2. The detecting electrode part 31 and the terminal part 33 are provided on the same principal surface of the insulating substrate 2.

The connecting part 32 which connects the detecting electrode part 31 and the terminal part 33 is mostly embedded in the insulating substrate 2. Both elongated wiring portions 321 of the pair of connecting parts 32 are formed between the insulating layer 22 on which the detecting electrode parts 31 and the terminal parts 33 are formed and the insulating layer 22 laminated on the inside surface thereof as shown in FIG. 9.

Each tip end of the pair of elongated wiring portions 321 is respectively connected to the pair of detecting electrode parts 31 through the via conductor 322 whereas each base end portion of the pair of elongated wiring portions 321 is respectively connected to the pair of terminal parts 33 through the via conductor 322.

In thus structured PM sensor element 1, the entire detecting electrode part 31 and the entire terminal part 33 form the exposed conductor part 301. The connecting part 32 forms the non-exposed conductor part 302. The detecting electrode part 31 and the terminal part 33 are formed of the noble metal conductor 3A. The via conductor 322 is formed of the noble metal conductor 3A. The elongated wiring portion 321 of the connecting part 32 is formed of the low expansion conductor 3B excepting both end portions.

In other words, both end portions of the elongated wiring portion 321 is formed of the noble metal conductor 3A and as a joint portion between the low expansion conductor 3B in the elongated wiring portion 321 and the noble metal conductor 3A, the connecting part 35 is formed.

The other structures are the same as those of Embodiment 1.

According to this embodiment, the improvements in both temperature cycle resistance and oxidation resistance can be achieved, as is the same with Embodiment 1.

Embodiment 4

This embodiment shows the PM sensor element 1 in which the terminal part 33 is formed of the porous noble metal conductor 3A and the via conductor 322 is formed of the noble metal conductor 3A with closed pores.

In other words, the terminal part 33 is formed of the porous noble metal conductor 3A and at least a portion of the detecting conductor 3 between the connecting part 32 formed of the low expansion conductor 3B and the terminal part 33 is formed of the noble metal conductor 3A with closed pores.

At the terminal part 33, the noble metal conductor 3A is provided with a number of pores and some of the pores are open to the outer surface.

On the other hand, at the via conductor 322, the noble metal conductor 3A is provided with closed pores, i.e., isolated pores which are not in communication with the exterior and the via conductor 322 is provided with no air passage arranged between both open ends of the interlaminar vias 11.

The terminal part 43 for heater is formed of the porous noble metal conductor as similar to the terminal part 33 and the via conductor 422 is formed of the noble metal conductor with closed pores as similar to the via conductor 322.

The detecting electrode part 31 is formed of the noble metal conductor 3A with closed pores as similar to the via conductor 322.

The other structures are the same as those of Embodiment 1.

Upon manufacturing the PM sensor element 1 of this embodiment, different from Embodiment 1, the conductive paste for making the terminal part 33 and the terminal part 43 for heater is different from the conductive paste for making the detecting electrode part 31, etc. In other words, as the conductive paste for making the terminal part 33 and the terminal part 43 for heater, a conductive paste in which glass fit or the like is mixed in addition to the metal powder and ceramics powder may be used.

The terminal part 33 and the terminal part 43 for heater are formed after the [decreasing/sintering process]. In other words, in the [pattern printing process] according to Embodiment 1 for the terminal part 33 and the terminal part 43 for heater, the conductive paste is printed on the green sheets before performing sintering process as is the same with the other detecting conductor 3 (such as detecting electrode part 31, etc.). However, in this embodiment, the printing process for the terminal part 33 and the terminal part 43 for heater is performed after performing sintering of the laminated body.

Further, patterns for the terminal part 33 and the terminal part 43 for heater are printed to the sintered laminated body in which the conductors of the other parts have been formed. By sintering the laminated body to which the patterns for the terminal part 33 and the terminal part 43 for heater have been printed, the porous terminal part 33 and the terminal part 43 for heater can be formed.

It is noted that the relative density of the terminal part 33 and the terminal part 43 for heater after sintering is preferably 50-95%. If the relative density is less than 50%, the strength of the terminal part 33 and the terminal part 43 for heater (hereinafter, may be referred to as the terminal part 33 and so on) becomes insufficient, and the electric resistance may become undesirably large. On the other hand, if the relative density is more than 95%, the effect of the reduction of the stress, which will be explained hereinafter, may not be obtained sufficiently.

In this embodiment, the terminal part 33 and so on is formed of the porous noble metal conductor 3A and therefore, the stress between the terminal part 33 and so on and the insulating substrate 2 can be reduced and as a result, the adhesion of the terminal part 33 and so on to the insulating substrate 2 can be improved.

By making the terminal part 33 and so on to have porosity, gases (air etc.) may pass through the terminal part 33 from outside and undesirably enter into the connection part 32. Further, when the gases may further enter to reach to the low expansion conductor 3B of the connecting part, oxidation thereof may be concerned. However, according to the embodiment, since the via conductors 322, 422 are formed of the noble metal conductor 3A with closed pores, the gases can be prevented from entering into the low expansion conductor 3B. Further, by forming the via conductors 322, 422 by the noble metal conductor 3A with closed pores, the stress on the via conductors 322, 422 in the interlaminar vias 11, 12 can be relieved to thereby further improve the temperature cycle resistance.

Other function and advantageous effects of this embodiment are the same as those of Embodiment 1.

Embodiment 5

In this embodiment, as shown in Embodiment 2 (FIG. 8), a portion of the base end side of the elongated wiring portion 321 as the connecting part 32 is formed of the noble metal conductor 3A, wherein the terminal part 33 is formed to have porosity.

According to this embodiment, at least one of the noble metal conductor 3A forming the via conductor 322 and the noble metal conductor 3A forming the base end portion of the elongated wiring portion 321 has closed pores. Both noble metal conductors 3A forming the via conductor 322 and the base end portion of the elongated wiring portion 321 may be provided with the close pores.

The other structures are the same with those of Embodiment 2. The porous noble metal conductor 3A and the noble metal conductor 3A with closed pores are the same structures as those of Embodiment 4, and may be formed with the same method with that of Embodiment 4.

In this embodiment, at least one of the noble metal conductor 3A forming the via conductor 322 and the noble metal conductor 3A forming the base end portion of the elongated wiring portion 321 has closed pores. Accordingly, even the gases may pass through the terminal part 33, such gases can be prevented from reaching the low expansion conductor 3B of the connecting part 32.

Other function and advantageous effects of this embodiment are the same as those of Embodiments 2 and 4.

Experimental Example

The temperature cycle test was performed to the PM sensor element 1 according to Embodiment 1 to evaluate the temperature cycle resistance.

In other words, the temperature cycle test was performed for Samples 1, 2, and 3 that will be later explained. The testing method and the evaluation method will be explained later.

Sample 1 is the PM sensor element 1 according to Embodiment 1 and the concrete manufacturing method will be explained with the materials to be used, and dimensions of the samples with reference to the items of "Sample 1" below.

Sample 2 is the PM sensor element in which the entire detecting conductor is formed with the same material mainly containing Pt. Other conditions are the same with Sample 1.

Sample 3 is the PM sensor element in which the entire detecting conductor is formed with the same material mainly containing W. Other conditions are the same with Sample 1.
(Sample 1)
(Green Sheet Molding Process)

In preparation for the green sheets 22a through 22e which are formed to be the insulating substrate 2, a molding material was prepared by weighing to be Al2O3 particulates: 88 wt %, binder (acryl resin): 10 wt %, solvent (toluene) 2% and mixing.

By applying the Doctor Blade Method, the prepared molding material is formed to be the size of length: 4 mm by width: 50 mm by thickness: 0.02 mm and dried at 80° C. for sixty (60) minutes to form a green sheet. The number of prepared green sheets 22a through 22e was five (5) sheets in total. Each green sheet 22a, 22b 22d and 22e was punched to form through-holes 110, 120 (corresponding to interlaminar vias 11, 12) with the diameter φ of 6 mm.
(Conductive Paste Preparing Process)

Conductive pastes A, B, and D is were prepared which includes Pt particulates, and conductive paste C was prepared which includes W particulates. Detail of each paste is explained as follows.
<Conductive Paste A>
  Pt particulates (average particulate diameter: 0.3 μm): 85 wt %;
  Alumina powder (average particulate diameter: 0.3 μm): 15 wt %;
  Acryl resin as a binder: 30 weight part; and Terpineol as a solvent: 10 weight part per 100 weight part of mixture powder of Pt particulates and Alumina powder were mixed.
<Conductive Paste B>
  Pt particulates (average particulate diameter: 0.3 μm): 95 wt %;
  Alumina powder (average particulate diameter: 0.3 μm): 5 wt %;
  Acryl resin as a binder: 30 weight part; and Terpineol as a solvent: 10 weight part per 100 weight part of mixture powder of Pt particulates and Alumina powder were mixed.
<Conductive Paste C>
  Mo particulates (average particulate diameter: 1 μm): 95 wt %;
  Alumina powder (average particulate diameter: 0.3 μm): 5 wt %;
  Acryl resin as a binder: 25 weight part; and Terpineol as a solvent: 10 weight part per 100 weight part of mixture powder of Mo particulates and Alumina powder were mixed.
<Conductive Paste D>
  Pt particulates (average particulate diameter: 0.5 μm): 90 wt %
  Glass frit (Borosilicate acid glass, average particulate diameter: 1 μm); 10 wt %
  Acryl resin as a binder: 30 weight part; and Terpineol as a solvent: 10 weight part per 100 weight part of mixture powder of Pt particulates and glass frit were mixed.
(Pattern Printing Process)
<Printing on Green Sheet 22a>

The through hole 110 of the green sheet 22a was filled with the conductive paste A by printing and a part of the via conductor 322 was formed.
<Printing on Green Sheet 22b>

The through hole 110 of the green sheet 22b was filled with the conductive paste A by printing, and a part of the via conductor 322 was formed. The elongated wiring portion 321 was printed on the principal surface of the green sheet 22b by the conductive paste C, using a mask with screen mesh on which the pattern of the elongated wiring portion 321 of the detecting conductor 3 for the positive electrode was drawn. Thereafter, the detecting electrode part 31 of the positive electrode was printed on the principal surface of the green sheet 22b by the conductive paste B, using a mask with screen mesh on which the pattern of the detecting electrode part 31 for the positive electrode was drawn.

It is noted that the size of the detecting electrode part 31 for the positive electrode was length: 3 mm by width: 0.6 mm by thickness: 0.03 mm, and the size of the elongated wiring portion 321 was wire width: 0.4 mm and thickness of 0.03 mm.
<Printing on Green Sheet 22c>

The elongated wiring portion 321 was printed on the principal surface of the green sheet 22c by the conductive paste C, using a mask with screen mesh on which the pattern of the elongated wiring portion 321 of the detecting conductor 3 for the negative electrode was drawn. Thereafter, the detecting electrode part 31 for the negative electrode was printed on the principal surface of the green sheet 22c by the conductive paste B, using a mask with screen mesh on which the pattern of the detecting electrode part 31 for the negative electrode was drawn.

It is noted that the size of the detecting electrode part 31 for the negative electrode was length: 3 mm by width: 0.6 mm by thickness: 0.03 mm, and the size of the elongated wiring portion 321 was wire width: 0.4 mm and thickness: 0.03 mm.

<Printing on Green Sheet 22*d*>

The through hole 120 of the green sheet 22*d* was filled with the conductive paste A by printing, and a part of the via conductor 422 was formed. Thereafter, the heating section 4 was printed on the principal surface of the green sheet 22*d* by the conductive paste C, using a mask with screen mesh on which the pattern of the heating section 4 was drawn.

It is noted that the size of the heating section 4 was width: 0.4 mm and thickness: 0.03 mm.

<Printing on Green Sheet 22*e*>

The through hole 120 of the green sheet 22*e* was filled with the conductive paste A by printing, and a part of the via conductor 422 was formed.

The conductive paste layers printed on each of the green sheets 22*a* through 22*e* were dried at the temperature of 70° C. for sixty (60) minutes.

(Laminating Process)

The green sheets 22*a*, 22*b*, 22*c*, 22*d* and 22*e* were laminated in this order to form a laminated body. It is noted that only green sheet 22*e* was reversely laminated with the surface on which the conductive paste was printed layered opposite to the printed surfaces of the other green sheets 22*a*, 22*b*, 22*c* and 22*d*.

(Degreasing and Sintering Process)

The laminated body was degreased at the temperature of 600° C. for four (4) hours under the humidified H2O/H2 environmental conditions and then sintered at the temperature of 1400° C. for five (5) hours under the inactive environmental conditions.

Thus, the sintered body of the laminated body was obtained.

(Terminal Part Forming Process)

By grinding both principal surfaces of the sintered body, the via conductors 322 and 422 were exposed, and then the conductive paste D was printed on the surface of the sintered body where the exposed via conductor 422 was exposed and heated at the temperature of 900° C. for one hour to form the terminal part 43. Similarly, the conductive paste D was printed on the surface of the sintered body where the exposed via conductor 322 was exposed and heated at the temperature of 900° C. for one hour to form the terminal part 33. Upon printing of the conductive paste D, a mask with a screen mesh on which the pattern of the terminal part 43 for heater or the terminal part 33 was drawn was used.

Two terminal parts 43 for heater having the size of length: 2 mm by width: 2 mm by thickness: 0.03 mm were formed for the positive electrode and the negative electrode. Two terminal parts 33 having the size of length: 2 mm by width: 2 mm by thickness: 0.03 mm were formed for the positive electrode and the negative electrode.

Thus, the PM sensor element 1 for Sample 1 was obtained.

(Evaluation Method)

Electric Voltage Application Test

After applying electric voltage for a predetermined time period on thus obtained Samples 1 through 3, the electric voltage application test was carried out through electric current energization and evaluated the samples. The initial evaluation by the electric voltage application test before performing the temperature cycle test and the temperature cycle evaluation by the electric voltage application test after performing the temperature cycle test were conducted to the PM sensor element. By comparing the result of the temperature cycle evaluation with the initial evaluation on each PM sensor element, three items, i.e., the operation conditions of the PM sensor, variation values of the electric current flowing in the PM sensor, and outer appearance (visual inspection) were confirmed.

Initial Evaluation

After confirming the heating of the PM sensor element to the temperature of 800° C., maintaining the temperature, a predetermined electric voltage application was carried out for 100 hours. After completing the voltage application, the PM sensor element was operated to confirm the operation conditions, electric current values and the outer appearance.

Temperature Cycle Evaluation

The PM sensor element for which the initial evaluation has been completed was heated from the room temperature to 800° C. and heating was stopped three minutes past from the time of reaching 800° C. One cycle is defined to be the temperature cycle from the room temperature to 800° C. and from 800° C. until the temperature returns to the room temperature by stopping heating after three minutes past from the time the temperature reaches 800° C. This temperature cycle was conducted 100 times. After confirming that the PM sensor element which had completed the temperature cycle evaluation was heated to 800° C., the predetermined electric voltage application was carried out for 100 hours. The PM sensor element which completed the predetermined electric voltage application was operated to confirm the operation conditions, electric current values and the outer appearance.

Sample 1 had no problems in the operation of the PM sensor by the temperature cycle evaluation comparing with the initial evaluation. The detected electric current value was less than 10% in electric current value reduction rate, which means that there was no current energization problem. Further, regarding the outer appearance, there was no color change at the exposed terminal parts. Thus, for the PM sensor element of Sample 1, it can be said that both the temperature cycle resistance and the oxidation resistance were secured.

Samples 2 and 3 did not succeed in the operation of the PM sensor by the temperature cycle evaluation comparing with the initial evaluation. The failure of measurement of the PM was confirmed and the detected electric current value was equal to or more than 30% in electric current value reduction rate, which means that there was any current energization problem. From these evaluation results, it is assumed that disconnection problem or the like may have occurred in the detecting conductor for Samples 2 and 3. Further, regarding the outer appearance, there was some color change found at the exposed terminal parts. Thus, for the PM sensor elements of Samples 2 and 3, it can be said that the temperature cycle resistance and the oxidation resistance were not secured.

According to the embodiments described above, two detecting electrode parts are provided. However, three or more detecting electrode parts may be provided instead of two.

Figure 10:
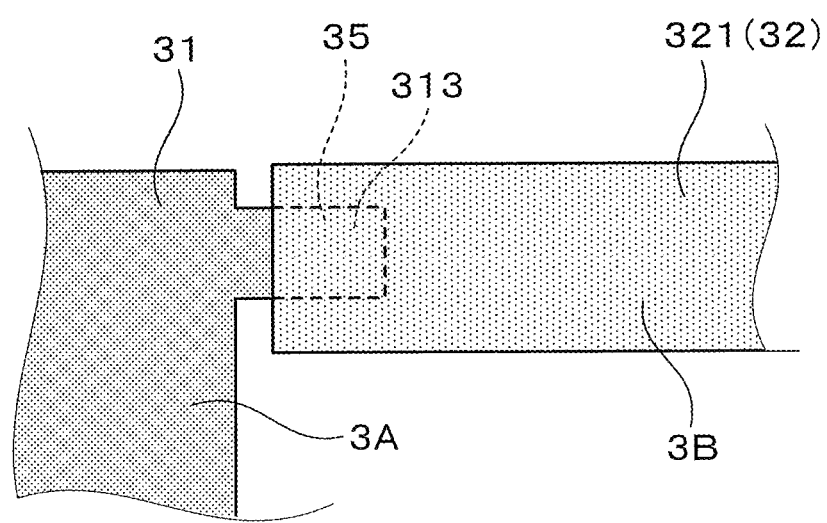
FIG. 10 is an explanatory plan view of a connecting part between a detecting electrode part and an elongated wiring portion in Modification.

According to the embodiments described above, as shown in FIG. 4, as the overlapping part 35, the noble metal conductor 3A is lapped over the low expansion conductor 3B to form the overlapping part 35, however, the positional relationship is not limited to this overlap relation. For example, as shown in FIG. 10, the overlapping part may be formed by lapping the low expansion conductor 3B over the noble metal conductor 3A. In FIG. 10 which shows a modified embodiment, a portion of the detecting electrode part 31 which is formed of the noble metal conductor 3A is provided with a projected pattern 313 projecting towards the low expansion conductor 3B side so that the elongated wiring portion 321 formed of the low expansion conductor 3B is formed to overlap on a portion of the projected pattern 313. The low expansion conductor 3B is formed to hold down the three sides of the projected pattern 313.

The present invention is not limited to the above-described embodiments and various changes and/or modifications will be within the scope of the invention as long as such are not beyond the subject matter of the invention.

The invention claimed is:

1. A particulate-matter detecting sensor element for detecting particulate-matters in a gas to be measured comprising:
    an insulating substrate having a detecting face to which particulate matters adhere;
    a plurality of detecting conductors formed in the insulating substrate, the detecting conductors having mutually different polarity; and
    a heating section formed at the insulating substrate; wherein each detecting conductor includes:
    a detecting electrode part at least partly exposed to the detecting face;
    a terminal part formed on an external surface of the insulating substrate and electrically connected to the detecting electrode part; and
    a connecting part that electrically connects the detecting electrode part and the terminal part, wherein
    at least a portion of the detecting conductor including the detecting electrode part is constituted of a noble metal conductor formed mainly of at least one noble metal selected from Pt, Au, Pd, Rh, and Ir;
    at least a portion of the connecting part is constituted of a low expansion conductor formed mainly of a low expansion coefficient metal which linear expansion coefficient is lower than that of the noble metal, and wherein
    the noble metal conductor and the low expansion conductor are joined at an overlapping part at which the noble metal conductor and the low expansion conductor are partly overlapped with each other on an insulating layer which forms the insulating substrate in a normal line direction of the insulating layer.

2. The particulate-matter detecting sensor element according to claim 1, wherein the low expansion coefficient metal is at least one metal selected from W and Mo.

3. The particulate-matter detecting sensor element according to claim 1, wherein the terminal part of the detecting conductor is constituted of the noble metal conductor.

4. The particulate-matter detecting sensor element according to claim 1, wherein the low expansion conductor is formed inside of the insulating substrate.

5. The particulate-matter detecting sensor element according to claim 1, wherein the insulating layer is formed in a plural number, a plurality of the insulating layers having the detecting electrode part formed therebetween, and the detecting face is formed on an end surface of the insulating substrate in a direction orthogonal to a laminated direction of the plurality of the insulating layers.

6. The particulate-matter detecting sensor element according to claim 1, wherein the detecting conductor includes an inner layer conductor formed between each of the plurality of the insulating layers and an outer layer conductor formed on the external surface of the insulating substrate in the laminated direction, an interlaminar via which interlayer-connects the inner layer conductor and the outer layer conductor is formed, and a via conductor in the interlaminar via is formed of the noble metal conductor.

7. The particulate-matter detecting sensor element according to claim 6, wherein a portion of the inner layer conductor which is directly connected to the interlaminar via connected to the outer layer conductor is formed of the noble metal conductor.

8. The particulate-matter detecting sensor element according to claim 1, wherein the overlapping part includes a solid solution layer formed by the noble metal and the low expansion coefficient metal.

9. The particulate-matter detecting sensor element according to claim 1, wherein the terminal part is constituted of the noble metal conductor that is porous.

10. The particulate-matter detecting sensor element according to claim 1, wherein at least a portion of an area between the connecting part and the terminal part formed of the low expansion conductor of the detecting conductor is constituted of the noble metal conductor with closed pores.

* * * * *